US012118875B2

(12) United States Patent
Lamb

(10) Patent No.: US 12,118,875 B2
(45) **Date of Patent: *Oct. 15, 2024**

(54) SECURITY SYSTEM AUTOMATIC BYPASS RESET

(71) Applicant: Ecolink Intelligent Technology, Inc., Carlsbad, CA (US)

(72) Inventor: Michael Lamb, Rancho Santa Fe, CA (US)

(73) Assignee: Ecolink Intelligent Technology, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/356,500

(22) Filed: Jul. 21, 2023

(65) Prior Publication Data

US 2023/0368647 A1 Nov. 16, 2023

Related U.S. Application Data

(62) Division of application No. 16/715,039, filed on Dec. 16, 2019, now Pat. No. 11,735,030, which is a division of application No. 16/417,828, filed on May 21, 2019, now Pat. No. 10,510,242, which is a division of application No. 15/985,304, filed on May 21, 2018, now Pat. No. 10,297,141, which is a division of application No. 15/287,386, filed on Oct. 6, 2016, now Pat. No. 9,978,258.

(51) Int. Cl.

| | |
|---|---|
| ***G08B 29/12*** | (2006.01) |
| ***G08B 13/08*** | (2006.01) |
| ***G08B 25/00*** | (2006.01) |
| ***G08B 29/04*** | (2006.01) |

(52) U.S. Cl.
CPC .............. *G08B 29/12* (2013.01); *G08B 13/08* (2013.01); *G08B 25/008* (2013.01); *G08B 29/04* (2013.01)

(58) Field of Classification Search
CPC ............................ G08B 13/08; G07C 9/00111
See application file for complete search history.

(56) References Cited

U.S. PATENT DOCUMENTS

| | | | | |
|---|---|---|---|---|
| 6,057,764 | A | 5/2000 | Williams | |
| 9,589,446 | B1 | 3/2017 | Dey | |
| 2004/0090327 | A1* | 5/2004 | Soloway .............. | G08B 25/008 340/545.1 |
| 2009/0146846 | A1 | 6/2009 | Grossman | |
| 2010/0019911 | A1* | 1/2010 | Chen ...................... | G08B 13/08 340/573.6 |
| 2014/0191862 | A1 | 7/2014 | Haines | |
| 2016/0140833 | A1 | 5/2016 | Lamb et al. | |
| 2016/0189526 | A1 | 6/2016 | Kennedy et al. | |
| 2016/0249012 | A1* | 8/2016 | Wang .................. | H04N 7/0127 |

OTHER PUBLICATIONS

ISA/US, International Search Report and Written Opinion issued on PCT application No. US17/54706, mailed Oct. 19, 2017, 9 pages.
European Patent Office, extended European Search Report issued on European patent application No. 17858950.3, 7 pages.
EPO, examination report issued on European patent application No. 17858950.3, dated Dec. 14, 2022, 4 pages.
European Patent Office, Examination Report issued on European patent application No. 17858950.3, dated Nov. 23, 2021, 5 pages.

* cited by examiner

*Primary Examiner* — Fabricio R Murillo Garcia
(74) *Attorney, Agent, or Firm* — Greenberg Traurig, LLP

(57) ABSTRACT

Methods and apparatus are described to automatically re-enable monitoring of a bypassed security sensor by a security system control device.

18 Claims, 5 Drawing Sheets

SECURITY SYSTEM AUTOMATIC BYPASS RESET

CROSS-REFERENCE TO RELATED APPLICATIONS

This application is a divisional of U.S. patent application Ser. No. 16/715,039, filed on Dec. 16, 2019, which is a divisional of U.S. patent application Ser. No. 16/417,828 filed on May 21, 2019, now U.S. Pat. No. 10,510,242, which is a divisional of U.S. patent application Ser. No. 15/985,304, filed on May 21, 2018, now U.S. Pat. No. 10,297,141, which is a divisional of U.S. patent application Ser. No. 15/287,386, filed on Oct. 6, 2016, now U.S. Pat. No. 9,978,258.

I. FIELD OF USE

The present application relates to the field of home security. More specifically, the present application relates to automatically re-enabling monitoring of a security sensor that has been bypassed by a security system control device.

II. DESCRIPTION OF THE RELATED ART

Security systems for homes and offices have been around for many years. Often, these systems make use of barrier alarms, such as door and window sensors installed onto doors and windows, motion detectors, sound detectors, etc. Door and window sensors typically comprise two distinct parts: a magnet and a reed switch assembly. The reed switch assembly is typically installed onto a fixed part of a window or onto a door frame, while the magnet is mounted to a movable portion, such as the door or window. When the door or window is closed, the magnet and reed switch are in close proximity to one another, maintaining the reed switch in a first state indicative of a "no alarm" condition. If the door or window is opened, proximity is lost between the magnet and the reed switch, resulting in the reed switch changing state, e.g., from closed to open or from open to closed. The change of state is indicative of a local alarm condition, i.e., unauthorized entry, and a signal may be generated by circuitry located within the reed switch assembly and sent, via wires or over-the-air, to a security panel, gateway, or other local device (herein "security system control device") in the home. Alternatively, or in addition, a loud audible alert may be generated, either by the security system control device via use of one or more sirens and/or directly by the circuitry within the reed switch assembly, indicating that a door or window has been opened without authorization.

One of the disadvantages of typical door and window alarm systems is that they do not allow occupants to easily open doors or windows without first turning off the alarm system. It is often inconvenient for the occupant to disarm the security system, as a keypad used to arm and disarm the security system may be located a great distance from the door or window to be opened.

Another disadvantage of prior art door/window security systems is that while the security system is disabled, intruders may enter the premises through the now un-monitored doors or windows without detection, as the entire security system may be disabled when it is desired to open a single door or window.

In order to address this shortcoming, prior art techniques have been developed to allow users to "bypass" a door or window sensor using either a keypad in communication with a security system control device or by pressing a button located directly on the door or window sensor. "Bypassing" a sensor means the security panel ignores alarm signals transmitted from bypassed sensors. The security panel reacts to alarm signals transmitted by non-bypassed sensors, as usual. This arrangement allows one to, for example, open a door or a window without having to disarm the entire security system.

However, one disadvantage of this bypass feature is that people tend to forget that they have bypassed a sensor and believe that their security system is fully-armed, i.e., that all sensors are operational and functioning normally, when the system is placed into an "armed-away" mode of operation, for example when they leave the house. This allows unauthorized entry through any entry barrier that is monitored by a bypassed sensor.

Thus, it would be desirable to provide a security system with a bypass feature that avoids the problem of people forgetting to re-enable monitoring of bypassed sensors.

SUMMARY

The embodiments described herein relate to methods, systems, and apparatus for automatically re-enabling monitoring of a bypassed barrier alarm device by a security system control device.

In one embodiment, a method is described, performed by a security system control device in a security system, for automatically re-enabling monitoring of a security sensor that has been bypassed, comprising receiving, by a processor, a command to bypass the security sensor, wherein bypassing the security sensor comprises ignoring, by the processor, future alarm signals received from the security sensor, receiving, by the processor, an indication from a user to change an operating mode of the security system from a first operating mode to a second operating mode, and in response to receiving the indication to change the operating mode of the security system, begin processing future alarm signals received from the security sensor via the receiver.

In another embodiment, a security system control device used in a security system is described, for automatically re-setting a security sensor that has been bypassed, comprising a receiver for receiving an alarm signal transmitted by a barrier alarm, a memory for storing processor-executable instructions and status information relating to the barrier alarm, a processor, coupled to the receiver and the memory, for executing the processor-executable instructions that causes the security system control device to receive a command, by the processor, to bypass the security sensor, wherein bypassing the security sensor comprises ignoring, by the processor, future alarm signals received from the security sensor via the receiver, receive, by the processor, an indication from a user to change an operating mode of the security system from a first operating mode to a second operating mode, and in response to receiving the indication to change the operating mode of the security system, begin to process future alarm signals received from the security sensor.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Figure 1:
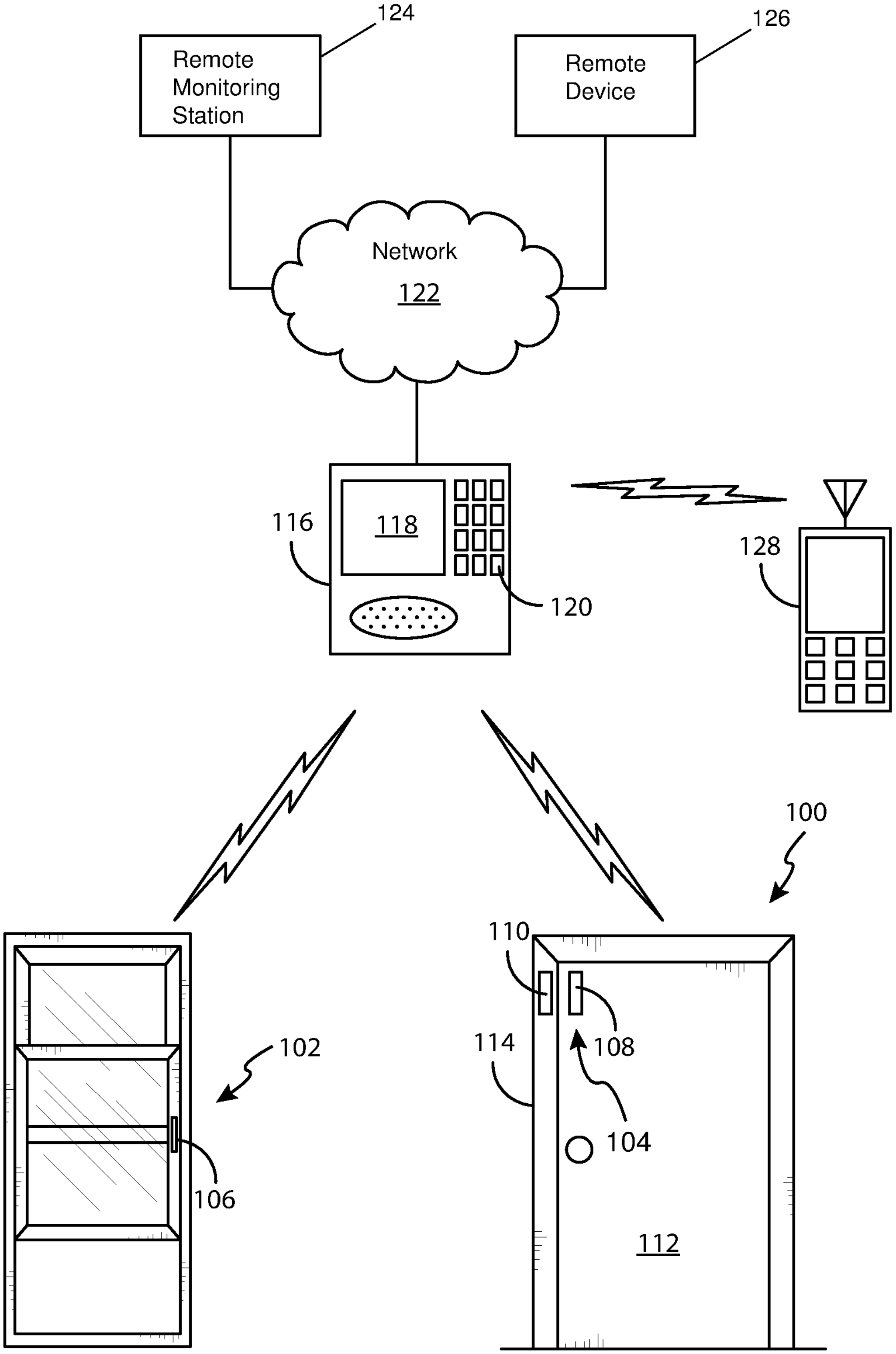
FIG. 1 is an illustration of a security system in accordance with one embodiment of the principles discussed herein.

The present disclosure describes methods and apparatus for automatically re-setting or re-enabling monitoring of a barrier alarm that has been previously bypassed by a security system control device. For the purpose of the discussions herein, the term "barrier alarm" means any device used to monitor and report states, physical conditions, attributes, status, or parameters of something being monitored, such as a door, window, open space, room, gate. Examples of barrier alarms comprise door and window sensors, motion detectors, passive infrared detectors, sound detectors, light interruption detectors, etc. Throughout the specification, the term "barrier alarm" is used interchangeably with "sensor" or "security sensor". Also, the term "bypass", "bypassed", bypass mode of operation" means that either the sensor does not transmit a signal to a central controller when an alarm event occurs (i.e., a door or window opens, a tilt sensor is tilted past a predetermined threshold, a motion sensor detects motion, etc.), or that a security system control device ignores alarm signals transmitted from bypassed sensors (i.e., the security system control device does not sound an alarm, illuminate a light or contact a remote monitoring facility). Finally, "re-setting" or "re-enabling" monitoring of a barrier alarm means either that a security panel stops ignoring alarm signals sent from a bypassed sensor when the sensor detects an alarm event (i.e., processes alarm signals that causes a sirens and/or lights to sound/flash locally and/or send a notification to a remote monitoring facility that an alarm has occurred), or that a sensor begins transmitting alarm signals when an alarm event occurs. Although a great majority of the present disclosure discusses sensors as door or window sensors, it should be understood that the concepts described herein could be applied to a wide variety of sensors, such as tilt sensors, motion sensors, glass breakage sensors, infra-red sensors, or just about any type of security sensor having a bypass capability.

Simple barrier alarms have been available for years, typically comprising a magnet and a reed switch assembly. One of these components is mounted to a door or window frame and the other is mounted to a door or movable portion of a door or window. When a door or window is in a closed position, the two components are in close proximity to each other such that the reed switch assembly senses the magnetic field generated by the magnet, causing the reed switch to reside in a first state (either open or closed). When the door or window is opened, the door or window-mounted component moves away from the other component, such that the magnetic field sensed by the reed switch assembly is reduced or eliminated. As a result, the state of the reed switch changes (e.g., from open to closed or from closed to open), and this state change may be detected by electronic circuitry in the reed switch assembly. The electronic circuitry may within the reed switch assembly may, in response, sound an audible alarm and/or illuminate a warning light at the reed switch assembly, and/or transmit an RF signal to a central controller located remotely from the barrier alarm. The RF signal may indicate that a state change of the reed switch has occurred, which in turn causes a local security panel to perform one or more actions, such as notifying a remote monitoring station, cause an audible and/or visual alarm (either by the security panel or at a remote location), and/or provide an indication of a location where the local alarm condition occurred (e.g., front door, bedroom1 window, etc.).

Other types of barrier alarms are also available that eliminate the need for a magnet. Such alarms utilize door or window acceleration/deceleration to determine whether a door or window has been opened or closed, and may be packaged in a single unit that is mounted to a door or movable portion of a window.

FIG. 1 is an illustration of a security system in accordance with one embodiment of the principles discussed herein. In this embodiment a door assembly 100 and a window assembly 102 are monitored by barrier alarms 104 and 106, respectively. Barrier alarm 104 comprises magnet 108 mounted to door 112 and reed switch assembly 110 mounted to door frame 114, while barrier alarm 106 comprises a magnet-less type sensor, as described above.

Each of the barrier alarms communicates with security system control device 116, typically using wireless RF signals generated by the barrier alarms and/or security system control device 116. For example, if door 112 is opened, reed switch assembly 110 detects a reduction or elimination of a magnetic field produced by magnet 108 as magnet 108 moves away from reed switch assembly 110 as door 112 is opened. In response, reed switch assembly 110 transmits a message to security system control device 116 indicative of a local alarm condition, e.g., door 112 has been opened.

In some embodiments, security system control device 116 may send messages to either of the barrier alarms requesting a status of either alarm, e.g., either "open" and/or "closed". In response, one or both barrier alarms may transmit a response to security system control device 116 indicating a status of the door or window, as the case may be. Other commands may be transmitted by security system control device 116, such as "sound alarm", "turn on lights", open gate, lock doors, etc.

As described above, security system control device 116 performs monitoring of barrier alarms 104, 106, and other security devices (for example, a tilt sensor, shock sensor, motion detector, passive infra-red detector, light interruption detector, etc.) that may be part of the security system. Security system control device 116 may be implemented as a security control panel, mounted in an inconspicuous location in a home, such as a closet, or a newer "self-contained" security panel, shown in FIG. 1, which is mounted in a conspicuous location to allow easy access for user interaction. Alternatively, security system control device 116 comprises a "hub", or gateway that acts as a digital conduit between the sensors and a remote server or computer which provides monitoring and processing capabilities for the security system over the Internet.

Security system control device 116 may also provide status information, generally by providing a visual indication of the status ("open", "closed", "on", "off", "normal", "alarm", etc.) of each barrier alarm or other security devices in the system. Alternatively, in an embodiment where security system control device 116 comprises a security control panel, security system control device 116 sends such status information for display by a separate display device, typically a combination keypad/display (not shown). In yet another embodiment, security system control device 116 may be configured to transmit station information to wireless communication device 128, such as a mobile telephone, tablet computer, desktop computer, etc. running software capable of interacting with security system control device 116. Security system control device 116 may also be in communication with an off-site remote monitoring station 124 via communication network 122, such as the Internet, PSTN, a fiber optic communication network, a wireless communication network (e.g., cellular, data, satellite, etc.), and/or other wide-area network. Remote monitoring station 124 typically provides security monitoring services for homes and businesses equipped with security systems such as the one shown in FIG. 1.

Remote monitoring station 124 is adapted to receive communications from security system control device 116 via network 122 in response to security system control device 116 receiving an indication of a local alarm condition being sensed by one or more barrier alarms/sensors in the security system. In other embodiments, security system control device 116 simply receives raw data from the barrier alarms and determines, based on the data, whether a local alarm condition has occurred. When a local alarm condition is detected, security system control device 116 generates a system alarm which may comprise taking one or more actions, such as notifying remote monitoring station 124 that a local alarm condition has occurred, illuminating one or more lights, sounding one or more audible alerts, etc.

In one embodiment, security system control device 116 may be operated via keypad 120, which allows a user of the security system to enter information into security system control device 116 and to get status information from security system control device 116 via display 118. Users may, alternatively or in addition, provide information to, and receive information from, security system control device 116 via a wireless communication device 128 (such as a smartphone, tablet computing device, or other mobile computing device) and/or a remote device 126 (such as a fixed or portable computer, smartphone, tablet computing device, or other mobile computing device) via a wireless or wired communication channel with network 122.

Often, it is a great inconvenience to disarm the entire system when a user wishes to temporarily open a door or a window, for example to get some fresh air. Prior art systems have addressed this problem by introducing the concept of temporarily "bypassing" or disabling a sensor (or a zone comprising two or more sensors) while the security system is armed. Bypassing a sensor will not cause security system control device 116 to perform actions normally taken when it detects that a change of state has occurred with one of the barrier alarms. In other words, the bypassed sensor is ignored by security system control device 116. Barrier alarms may be bypassed "locally" by pressing a button on a barrier alarm that causes the barrier alarm to stop sending alarm signals or otherwise disables the barrier alarm, or they may be bypassed at security system control device 116 by selecting one or more barrier alarms and/or zones for bypass. In another embodiment, in response, security system control device 116 ignores future alarm signals from the bypassed barrier alarm(s). Re-arming, re-enabling or resetting a bypassed sensor may be accomplished locally at a barrier alarm or at security system control device 116 and in one embodiment, automatically performed by security system control device 116.

Figure 2:
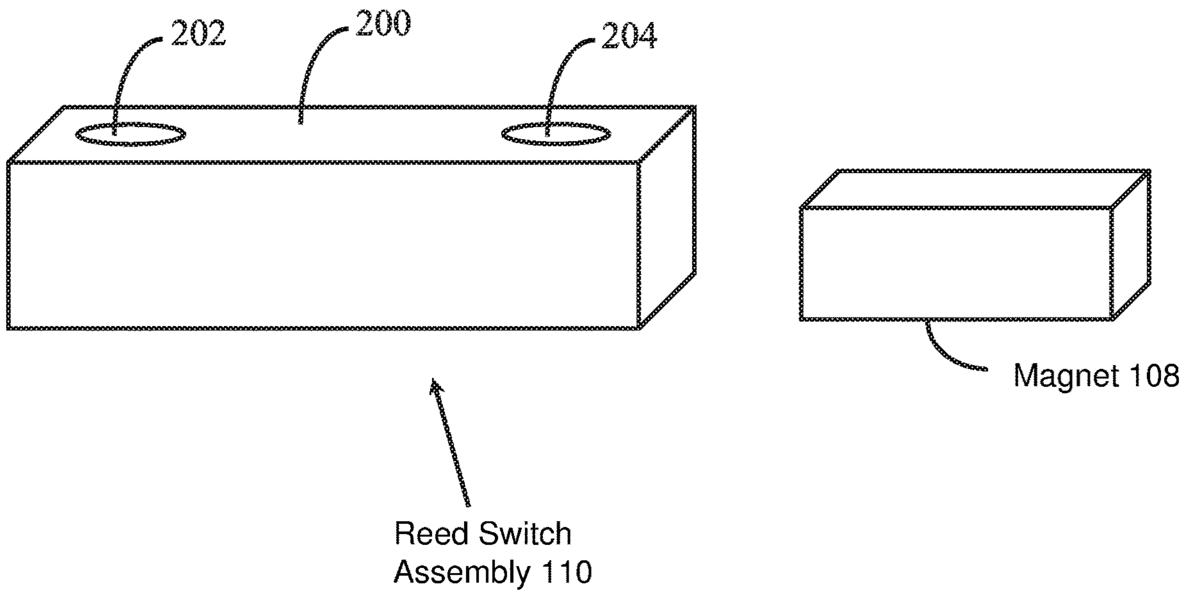
FIG. 2 is a perspective view of one embodiment of a barrier alarm having a local bypass capability, comprising a magnet and a reed switch assembly.

FIG. 2 is a perspective view of one embodiment of a barrier alarm device having a local bypass capability, comprising magnet 108 and reed switch assembly 110. Reed switch assembly comprises housing assembly 200 that covers a reed switch, electronic circuitry, and a battery (not shown) used to detect the presence or absence of a magnetic field produced by magnet 108 and a transmitter to transmit information to security system control device 116 relating to the status of a door or window.

The barrier alarm shown in FIG. 2 further comprises a user input device 202 for temporarily bypassing or disarming the barrier alarm. Such a device may comprise a mechanical switch (i.e., pushbutton, momentary pushbutton, toggle, slide, etc.), an opto-electrical switch, a heat sensing device (to detect the presence of a human finger), a capacitive sensor, or any other type of switch or sensor to provide an indication to the barrier alarm that a user wishes to temporarily disarm the barrier alarm. In another embodiment, the barrier alarm device comprises a standard door or window sensor, or some other prior art sensor, that is not configured for local bypass.

The barrier alarm shown in FIG. 2 may further comprise status indicator 204, used to convey the status of the barrier alarm as being armed or disarmed, the term "armed" referring to an ability to detect and/or report an event (e.g., movement of a door or window, closing/opening of a door or window, etc.), and the term "disarmed" referring to a condition where the barrier alarm cannot detect and/or report an event. Status indicator 204 may comprise an LED, LCD, or any other device for providing a visual status of the barrier alarm, or it may comprise a device capable of emitting audible tones, messages, alerts, etc., that also indicate a status of the barrier alarm. In one embodiment, indicator 204 comprises a multi-color LED, for example an LED package that is able to produce red light and a green light, red for indicating that the barrier alarm is disabled and green for indicating that the barrier alarm is armed. Of course, other colors may be used to differentiate between an armed and unarmed condition. In other embodiments, two or more visual indicators may be used to convey status.

Figure 3:
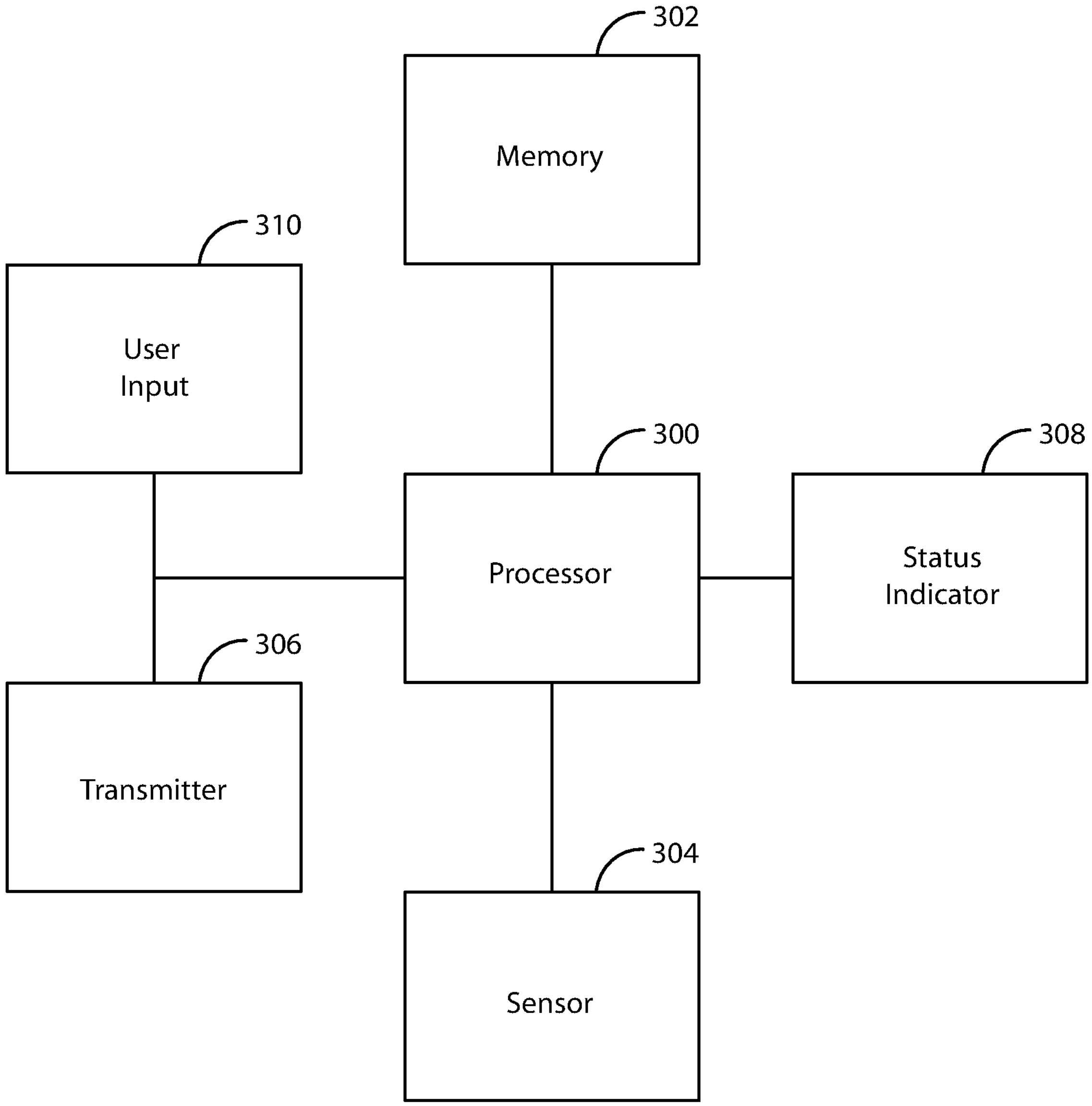
FIG. 3 is a functional block diagram of one embodiment of the barrier alarm shown in FIG. 2.

FIG. 3 is a functional block diagram of one embodiment of the barrier alarm shown in FIG. 2. Specifically, FIG. 3 shows processor 300, memory 302, sensor 304, transmitter 306, status indicator 308, and user input 310. It should be understood that not all of the functional blocks shown in FIG. 3 are required for operation of the barrier alarm (for example, status indicator 308 may not be necessary), that the functional blocks may be connected to one another in a variety of ways, and that not all functional blocks are necessary for operation of the barrier alarm are shown (such as a power supply), for purposes of clarity.

Processor 300 is configured to provide general operation of the barrier alarm by executing processor-executable instructions stored in memory 302, for example, executable code. Processor 300 typically comprises a general purpose processor, such as an ADuC7024 analog microcontroller manufactured by Analog Devices, Inc. of Norwood Massachusetts, although any one of a variety of microprocessors, microcomputers, and/or microcontrollers may be used alternatively.

Memory 302 comprises one or more information storage devices, such as RAM, ROM, EEPROM, UVPROM, flash memory, SD memory, XD memory, or other type of electronic, optical, or mechanical memory device. Memory 302 is used to store processor-executable instructions for operation of the barrier alarm as well as any information used by processor 300, such as threshold information, parameter information, identification information, current or previous door or window status information, audible or visual alerts for driving status indicator 308, etc.

Sensor 304 is coupled to processor 300 and monitors or determines a state, physical condition, attribute, status, or parameter of something, such as the status of a door, window, or gate (e.g., "open", "closed", "movement detected", etc.), lamp or siren (e.g., "on" or "off"), motion detector ("motion detected" or "no motion detected"), whether a room is occupied ("yes", "no", "1", "0", etc.), whether movement is detected in a predetermined area or volume ("motion detected" or "no motion detected"), etc. Sensor 304 may comprise one or more magnet/reed switch combinations, motion detectors, Infrared detectors, audio detectors, tilt sensors, switches, light interruption sensors, accelerometers, gyroscopes, angle sensors, or other sensor to detect a change in a physical condition of a device or a change in an environment in which the device is located.

User input 310 is used for temporarily bypassing or disarming the barrier alarm, comprising one or more mechanical switches (i.e., pushbutton, momentary pushbutton, toggle, slide, etc.), opto-electrical switches, heat sensing devices (to detect the presence of a human finger), capacitive sensors, or any other type of switch or sensor to provide an indication to the barrier alarm that a user wishes to temporarily disarm the barrier alarm.

Status indicator 308 is used to convey the status of the barrier alarm as being armed or disarmed. Status indicator 308 may comprise an LED, LCD, or any other device for providing a visual status of the barrier alarm, or it may comprise a device capable of emitting audible tones, messages, alerts, etc., that also indicate a status of the barrier alarm. In one embodiment, indicator 308 comprises a multi-color LED, for example an LED package that is able to produce red light and a green light, red for indicating that the barrier alarm is disabled and green for indicating that the barrier alarm is armed. Of course, other colors may be used to differentiate between an armed and unarmed condition. In other embodiments, two or more visual indicators may be used to convey status.

Transmitter 306 comprises circuitry necessary to wirelessly transmit status messages and other information from the barrier alarm to security system control device 116, either directly or through in intermediate device, such as a repeater, commonly used in popular mesh networks. Such circuitry is well known in the art and may comprise BlueTooth, Wi-Fi, RF, optical, ultrasonic circuitry, among others. Alternatively, or in addition, transmitter 306 comprises well-known circuitry to provide signals to security system control device 116 via wiring, such as telephone wiring, twisted pair, two-conductor pair, CAT wiring, AC home wiring, or other type of wiring.

In normal operation, processor 300 executes processor-executable instructions stored in memory 302 that causes the barrier alarm to monitor information provided by sensor 304 for changes in one or more states, physical conditions, attributes, status, or parameters of something being monitored, such as the condition of a door or window being "open" or "closed". Processor 300 uses data from the sensor to determine whether a predetermined condition has occurred relating to the barrier alarm (herein "local alarm condition"), such as a door or window being monitored by a barrier alarm changing state from "closed" to "open", a light being turned on, motion being sensed, etc. If processor 300 determines that one or more predetermined conditions have been satisfied, indicating the occurrence of a local alarm condition, it generates an alarm signal and provides the alarm signal to transmitter 306 for transmission to security system control device 116. In one embodiment, the local alarm message comprises a notification to security system control device 116 that a local alarm condition has been detected by sensor 304. In another embodiment, the alarm signal simply indicates that sensor 304 has changed state, i.e., that a door or window has been opened or closed.

In one embodiment, the barrier alarm transmits a "heartbeat" or "supervisory" message at predetermined time intervals, alerting security system control device 116 that the barrier alarm is active, e.g., monitoring for one or more predetermined local alarm conditions. Transmitting such a signal at regular intervals ensures that the barrier alarm has not been removed, altered, damaged, or tampered with. Such messages may be required by one or more standards-setting bodies, such as Underwriter Laboratories of Camas, Washington. If barrier alarm fails to transmit such a message at one of the scheduled time intervals, security system control device 116 may declare that a local alarm condition has occurred, and perform one or more actions, such as sound an audible alert or notify remote monitoring station 124 that a local alarm condition has occurred.

When a user of the security system wishes to open a door or window, or otherwise perform an action that would normally trigger a local alarm condition by the barrier alarm, without having to disarm the entire security system at security system control device 116, the user may activate a "bypass" mode of operation of the barrier alarm. This may be accomplished by the user pressing user input 202, entering a bypass command into security system control device 116 directly using a keypad, or via a mobile device such as wireless communication device 128.

In bypass mode, the barrier alarm may be disarmed, meaning one or more of the following: that the barrier alarm cannot transmit information to security system control device 116; that sensor 304 is disabled and can no longer sense or provide information to processor 300; that one or more predetermined events that normally result in an alarm condition are altered such that a comparison of data from the sensor to the altered event definition cannot result in an alarm condition; or that the one or more predetermined events can no longer be referenced by processor 300 (e.g., the event definitions remain unaltered, but inaccessible for comparison by processor 300 to sensor data). In another embodiment, security system control device 116 receives a command from a user via a keypad or wireless communication device 128 to bypass one or more barrier alarms, where future alarm signals from bypassed barrier alarms are ignored by security system control device 116. This may comprise security system control device 116 no longer monitoring such bypassed barrier alarms or processing alarm signals received from such barrier alarms and taking no action if security system control device 116 determines that a barrier alarm is bypassed. In one embodiment, the "heartbeat" or "supervisory" message is still transmitted to security system control device 116 and processed, even when the barrier alarm is bypassed, so that a supervisory alarm condition generated by security system control device 116 can be avoided.

Once the bypass mode has been entered, a user may position a door, window, gate, or other device in any position (such as opening a door, window, or gate), or may enter a room monitored by a motion sensor or passive infrared sensor, without causing security system control device 116 to declare that a local alarm condition has occurred, e.g., perform one or more actions normally associated after determining that a local alarm event has occurred.

When the user wishes to re-arm the barrier alarm, e.g., enter the normal mode of operation, the user may provide an indication to the barrier alarm by using user input 202, or via security system control device 116. This is normally done after the user ensures that an alarm condition will not be generated immediately upon entering the normal mode. For example, the user will typically close a door or window prior to entering the normal mode, or after a room has been cleared of any human presence.

Often, a user will forget to re-enable a bypassed barrier alarm. For example, a user may bypass a barrier sensor that monitors the user's bedroom window before going to bed and forget to re-arm the bypassed barrier alarm upon leaving the house the following morning. In order to prevent this from happening, security system control device 116 may be configured to automatically re-arm any bypassed barrier alarms upon detection of one or more events. For example, when a user changes the operating mode of security system control device 116, security system control device 116 may automatically re-arm any bypassed barrier alarms, as explained in further detail below.

In one embodiment, the normal mode of operation is entered automatically when a magnetic field is sensed by sensor 304 and processor 300, e.g., in an application where a magnetic door/window sensor is brought in close proximity with a magnet when a door or window is placed in a closed position. When the magnetic field is detected, it indicates that the door, window, or gate is in a closed position, and to enter the normal mode of operation.

After the normal mode of operation has been entered, status indicator 308 may be illuminated, extinguished, or its state changed (e.g., green LED illuminated; green LED illuminated and red LED extinguished) to indicate to the user that the barrier alarm is in normal mode. In one embodiment, if the "heartbeat" or "supervisory" message transmission was suspended while in bypass mode, the "heartbeat" or "supervisory" message transmission process continues. In another embodiment, in response to being placed in normal mode, the barrier alarm may transmit a message to security system control device 116 indicating that the barrier alarm is entering normal mode and to begin monitoring and/or processing status messages sent by the barrier alarm in a usual manner, e.g., performing an action if the barrier alarm indicates a local alarm condition.

Figure 4:
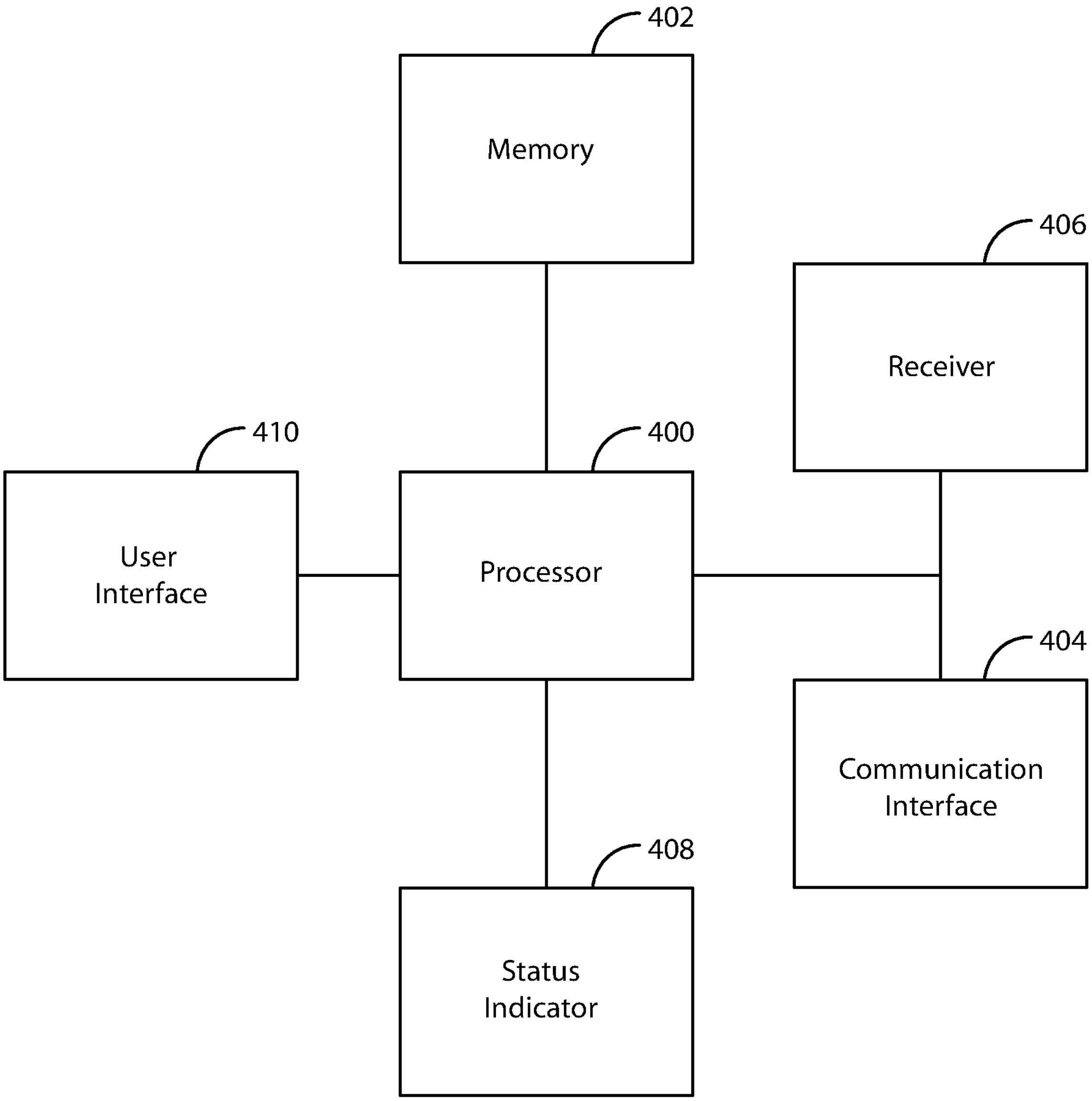
FIG. 4 is a functional block diagram of one embodiment of a security system control device shown in FIG. 1.

FIG. 4 is a functional block diagram of one embodiment of security system control device 116 as shown in FIG. 1. Specifically, FIG. 4 shows processor 400, memory 402, communication interface 404, receiver 406, status indicator 408, and user interface 410. It should be understood that not all of the functional blocks shown in FIG. 4 are required for operation of security system control device 116 (for example, status indicator 408 may not be necessary), that the functional blocks may be connected to one another in a variety of ways, and that not all functional blocks are necessary for operation of security system control device 116 are shown (such as a power supply), for purposes of clarity.

Processor 400 is configured to provide general operation of security system control device 116 by executing processor-executable instructions stored in memory 402, for example, executable code. Processor 400 typically comprises a general purpose processor, such as an ADuC7024 analog microcontroller manufactured by Analog Devices, Inc. of Norwood Massachusetts, although any one of a variety of microprocessors, microcomputers, and/or microcontrollers may be used alternatively.

Memory 402 comprises one or more information storage devices, such as RAM, ROM, EEPROM, UVPROM, flash memory, SD memory, XD memory, or other type of electronic, optical, or mechanical memory device. Memory 402 is used to store processor-executable instructions for operation of security system control device 116 as well as any information used by processor 400, such as threshold information, parameter information, identification information, current or previous door or window status information, audible or visual alerts for driving status indicator 408, information relating to the type, number, and status of sensors registered with security system control device 116, information pertaining to the bypass status of any barrier alarm, etc.

User interface 410 comprises hardware and/or circuitry for allowing a user to interact with security system control device 116 to enter information and commands and to receive status information of the security system and/or individual sensors. In another embodiment, user interaction occurs via a separate keypad/display, or via wireless communication device 128. For example, a user may arm or disarm security system control device 116, typically by pushing one or more keys of a keypad that comprises user interface 410. When security system control device 116 is armed, it typically will transmit a message to remote monitoring station 124 and/or perform one or more actions, such as sound an audible alarm and/or cause one or more lights to become illuminated, for example, if any of the barrier alarms in communication with security system control device 116 indicates that a local alarm condition has occurred. The term "local alarm condition" refers to an event or condition that is detected by a barrier alarm in the security system when the barrier alarm detects the occurrence of an event, such as a door or window being opened, motion being detected, a temperature increase, a light being illuminated, a sound being detected, etc. The detection of a local alarm condition may be performed by one or more sensors, or it may be determined by security system control device 116 as it receives "raw" data from the one or more sensors in the security system. For example, security system control device 116 may receive data from a motion detector upon the motion detector sensing motion in a room, however security system control device 116 processes this data in order to determine if a local alarm condition has occurred (e.g., whether the raw data indicates that an intruder has entered a room). In another example, a door sensor simply transmits a message to security system control device 116 upon detection of a status change of the door, e.g., detecting that the door has been opened or closed. Other barrier alarms may perform processing on locally-generated data to determine if a local alarm condition has occurred. For example, a motion detector may comprise a sensor that provides data when movement is detected in a room. However, the motion detector may comprise circuitry that processes the data to determine if the movement is related, perhaps, to an animal, rather than an intruder. In this case, the motion detector may only send a "local alarm signal" to security system control device 116 indicating that a local alarm condition has occurred, rather than sending any of the raw data detected by the motion detector. In another embodiment, a barrier alarm may transmit raw data as well as a local alarm signal to security system control device 116.

Communication interface 404 comprises circuitry necessary to wirelessly transmit status messages and other information from security system control device 116 to remote devices, such as wireless communication device 128, either directly or through in intermediate device, such as a repeater, commonly used in popular mesh networks. Such circuitry is well known in the art and may comprise BlueTooth, Wi-Fi, RF, optical, ultrasonic circuitry, among others. Alternatively, or in addition, communication interface 404 comprises well-known circuitry to provide signals via hard wiring, such as telephone wiring, twisted pair, two-conductor pair, CAT wiring, AC home wiring, or other type of wiring. Communication interface 404 may also comprise circuitry used to receive commands and other information from such wireless or wired devices.

A user of the security system may cause security system control device 116 to enter an "armed" state of operation by providing input using user interface 410, a connected keypad or wireless communication device 128. For example, a user may wish to enter an "armed-away" state just prior to leaving a residence, for example, or an "armed-home" state prior to going to bed. When security system control device 116 is in the "armed-home" state, it generally monitors all barrier alarms but ignores signals transmitted by motion sensors used to detect motion within a home. In the "armed-away" state, security system control device 116 monitors all of the barrier alarms and other sensors, including any interior motion sensors.

A user may disarm security system control device 116 also using user interface 410, attached keypad or wireless communication device 128, e.g., place security system control device 116 in a disarmed state of operation. In this state, local alarm conditions either determined by security system control device 116 or by barrier alarms themselves will not result in security system control device 116 performing one or more actions normally taken when security system control device 116 is in the armed state. In other words, in the disarmed state, security system control device 116 will not generate a system alarm, even if a local alarm condition has occurred. A user may place security system control device 116 in the disarmed state upon returning home or upon waking up, for example. In one embodiment, security system control device 116 may generate an audible alert and/or cause a visual indication indicating that a local alarm condition has been determined for purposes of information for the user. The audible alert may comprise a soft, short tone or chime, while a visual indication may comprise an LED that is illuminated on security system control device 116 via user output 410.

Status indicator 408 is used to convey the status of security system control device 116 as being armed-home, armed-away or disarmed, as well as providing an indication of the open/close status and/or bypassed status of one or more barrier alarms distributed throughout a home. Status indicator 408 may comprise one or more LEDs, LCDs, seven segment displays, an electronic display, or any other device for providing a visual status of security system control device 116 and the barrier alarm(s), or it may comprise a device capable of emitting audible tones, messages, alerts, etc., that also indicate a status of security system control device 116 and the barrier alarm(s). In one embodiment, a graphical user interface is displayed on an electronic display, providing a graphical display of the status of each component in the security system (e.g., security system control device 116, barrier alarms and other sensors).

Receiver 406 comprises circuitry necessary to wirelessly receive messages from one or more barrier alarms and other sensors distributed throughout a home, either directly or through in intermediate device, such as a repeater, commonly used in popular mesh networks. Such circuitry is well known in the art and may comprise BlueTooth, Wi-Fi, RF, optical, ultrasonic circuitry, among others. Alternatively, or in addition, receiver 406 comprises well-known circuitry to receive messages from barrier alarms via wiring, such as telephone wiring, twisted pair, two-conductor pair, CAT wiring, AC power wires, or other type of wiring. Receiver 406 may additional comprise circuitry to receive commands or provide status information using common wireless communication techniques such as Wi-Fi or Bluetooth circuitry.

In one embodiment, one or more barrier alarms "heartbeat" or "supervisory" messages are received from one or more barrier alarms in the security system by receiver 406 at predetermined time intervals, alerting security system control device 116 that a particular barrier alarm is active, e.g., monitoring for one or more predetermined local alarm conditions. Receiving such a signal at regular intervals ensures that the barrier alarm has not been removed, altered, damaged, or tampered with. Such messages may be required by one or more standards-setting bodies, such as Underwriter Laboratories of Camas, Washington. The failure of security system control device 116 to receive such a message at one of the scheduled time intervals may be defined as a local alarm condition, causing security system control device 116 to generate a system alarm and/or perform one or more actions, such as sound an audible alert or notify remote monitoring station 124 that an alarm condition has occurred.

In one embodiment, the normal mode of operation is entered automatically when a magnetic field is sensed by sensor 304 and processor 300, e.g., in an application where a magnetic door/window sensor is brought in close proximity with a magnet when a door or window is placed in a closed position. When the magnetic field is detected, it indicates that the door, window, or gate is in a closed position, and to enter the normal mode of operation. In that case, a request is transmitted from the bypassed barrier alarm to security system control device 116, indicating that the user wishes security system control device 116 to treat the bypassed barrier alarm normally.

Figure 5:
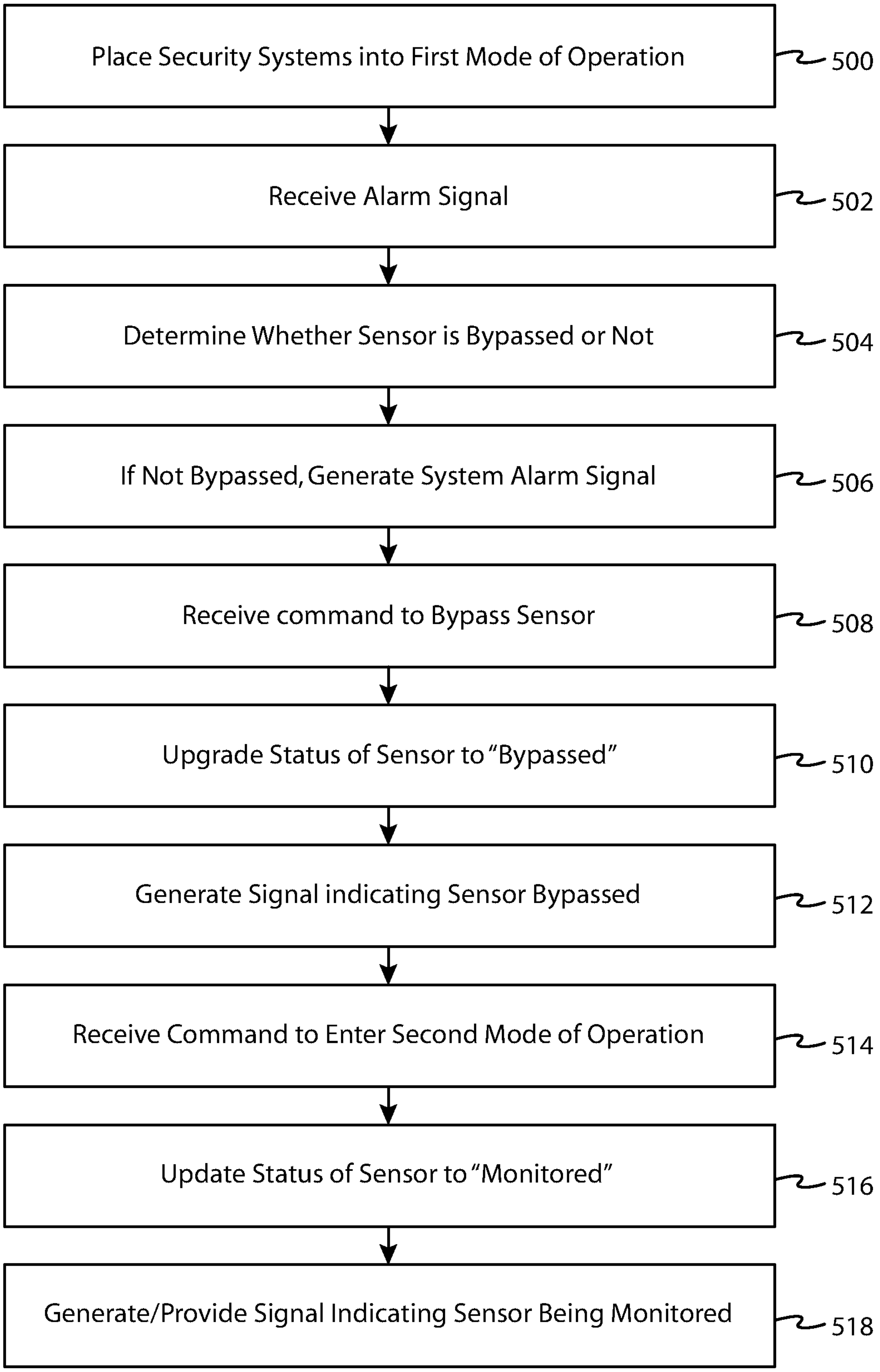
FIG. 5 is a flow diagram illustrating one embodiment of a method performed by the security system control device shown in FIG. 1 for automatically re-arming a barrier alarm after it has been bypassed.

FIG. 5 is a flow diagram illustrating one embodiment of a method performed by security system control device 116 for automatically re-arming a barrier alarm after it has been bypassed. Reference is made to the barrier alarm shown in FIG. 2, although the method could apply to virtually any type of barrier alarm. It should be understood that in some embodiments, not all of the steps shown in FIG. 5 are performed. It should also be understood that the order in which the steps are carried out may be different in other embodiments.

At block 500, a security system, such as the one shown in FIG. 1, is placed into an armed-home mode of operation. To place the security system into the armed-home mode of operation, a user provides a command to security system control device 116 via user interface 410, a connected keypad or wireless communication device 128 to enter the armed-home mode of operation.

At block 502, processor 400 may receive an alarm signal from a barrier alarm in the security system in response to a local alarm condition occurring in proximity to the reporting barrier alarm. For example, when a window monitored by a barrier alarm is opened, the barrier alarm transmits an alarm signal to causing the barrier alarm to security system control device 116.

At block 504, in response to receiving the alarm signal, processor 400 determines whether the barrier alarm has been bypassed, by checking a status indication stored in association with each of the barrier alarms in memory 402. Memory 402 may store status information associated with each barrier alarm in the security system, i.e., open, close, monitored, not monitored (bypassed), barrier alarm identification code, location, zone, etc.

At block 506, if the status of the reporting barrier alarm as stored by memory 202 indicates that the reporting barrier alarm is being monitored, processor 400 generates a system alarm signal for indicating that a barrier has been opened while the security system is armed. The system alarm signal may be used to provide a visual or audible alert within the home to indicate that a local alarm condition has occurred, and/or it may be used to provide information to remote monitoring station 124 to alert authorities of a possible break-in. Alternatively, or in addition, the system alarm signal may be provided to other remote locations, such as to wireless communication device 128 via receiver 406.

At block 508, after the security system has been reset by the user, one or more barrier alarms may be bypassed either locally at one or more barrier alarms or via security system control device 116. In one embodiment, processor 400 receives a command to bypass one or more barrier alarms via either user interface 410, a connected keypad, or from wireless communication device 128. In another embodiment, processor 400 receives an indication from one or more barrier alarms via receiver 406 to stop monitoring each reporting barrier alarm, as directed by a user proximate to each reporting barrier alarm. The indication typically comprises an identification of the barrier alarm being bypassed.

At block 510, processor 400 updates a status of any barrier alarm as "bypassed" by providing an indication of such to memory 402.

At block 512, processor 400 may generate a signal and provide it to status indicator 408 in order to alert a user that one or more barrier alarms have been bypassed. The signal may cause status indicator 408 to change state, e.g., become illuminated or extinguished, change color, emit an audible tone, or exhibit some other change.

At block 514, at some time later, processor 400 receives a command from a user to place the security system into a new state of operation. The command may be provided to processor 400 via user interface 410, a connected keypad or wireless communication device 128. For example, the user may place the security system into an armed-away mode of operation from an armed-home mode of operation just before leaving the user's home. In another example, the user may place the security system into an armed-home mode of operation from a disarmed mode of operation just before going to bed. In yet another example, the user may place the security system into a disarmed state of operation from a home-armed mode of operation.

At block 516, in response to receiving the command to change the state of operation of the security system, processor 400 updates the status of any bypassed barrier as stored by memory 402 to a non-bypassed, or monitored, status. Thereafter, processor 400 processes future alarm signals received from the barrier alarm in a normal fashion, as described by blocks 502-506.

At block 518, processor 400 may generate a signal and provide it to status indicator 408 in order to alert a user that one or more barrier alarms have been re-set, re-armed or otherwise placed back into a monitored status. The signal may cause status indicator 408 to change state, e.g., become illuminated or extinguished, change color, emit an audible tone, or exhibit some other change, or it may be provided to the user via a connected display or via wireless communication device 128. In one embodiment, processor 400 may not enter the state of operation desired by the user, i.e., armed-home or armed away, if a door or window is open as a result of a corresponding sensor being previously bypassed. In this case, processor 400 may generate a signal, indicating that one or more doors or windows are open, and provide it to the user via status indicator 408, the connected display or wireless communication device 128.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A method performed by a security system control device in a security system, the security system comprising the security system control device and one or more security sensors separate from and coupled to the security system control device, the method comprising:

receiving a first command to bypass a first security sensor of the one or more security sensors;

in response to receiving the first command, ignoring alarm signals received from the first security sensor;

receiving a second command to change a mode of operation of the security system; and in response to receiving the second command, begin processing future alarm signals received from the first security sensor.

2. The method of claim 1, wherein a first mode of operation comprises an armed-home mode of operation and a second mode of operation comprises an armed-away mode of operation, wherein the second command comprises an instruction for the security system control device to change the mode of operation of the security system from the armed-home mode of operation to the armed-away mode of operation.

3. The method of claim 1, wherein a first mode of operation comprises an armed-away mode of operation and a second mode of operation comprises a disarmed mode of operation, wherein the second command comprises an instruction for the security system control device to change the mode of operation of the security system from the armed-away mode of operation to the disarmed mode of operation.

4. The method of claim 1, wherein beginning to process future alarm signals comprises causing a siren to sound in response to receiving a first alarm signal from the first security sensor after the mode of operation has been changed.

5. The method of claim 1, wherein beginning to process future alarm signals comprises sending a system alarm signal to a remote monitoring station in response to receiving a first alarm signal from the security sensor after the mode of operation has been changed.

6. The method of claim 1, further comprising:

in response to receiving the first command, transmitting a message to a remote location indicating that the first security sensor has been bypassed.

7. The method of claim 1, further comprising:

in response to receiving the second command, providing an indication that the first security sensor has changed status from being bypassed to being monitored.

8. The method of claim 1, wherein the second command is wirelessly received from a keypad coupled to the security system control device.

9. The method of claim 1, wherein the second command is received from a wireless communication device.

10. A security system control device used in a security system, the security system comprising the security system control device and one or more security sensors separate from and coupled to the security system control device, the security system control device comprising:

a receiver for receiving alarm signals from the one or more security sensors;

a memory for storing processor-executable instructions;

a processor, coupled to the receiver and the memory, for executing the processor-executable instructions that causes the security system control device to:

receive, by the processor via the receiver, a first command to bypass a first security sensor of the one or more security sensors;

in response to receiving the first command, ignore, by the processor, alarm signals received from the first security sensor via the receiver;

receive, by the processor, a second command to change a mode of operation of the security system; and in response to receiving the second command, begin to process, by the processor, future alarm signals received from the first security sensor.

11. The security system control device of claim 10, wherein a first mode of operation comprises an armed-home mode of operation and a second mode of operation comprises an armed-away mode of operation, wherein the second command comprises an instruction for the security system control device to change the mode of operation of the security system from the armed-home mode of operation to the armed-away mode of operation.

12. The security system control device of claim 10, wherein a first mode of operation comprises an armed-away mode of operation and a second mode of operation comprises a disarmed mode of operation, wherein the second command comprises an instruction for the security system control device to change the mode of operation of the security system from the armed-away mode of operation to the disarmed mode of operation.

13. The security system control device of claim 10, wherein the processor-executable instructions that causes the security system control device to begin processing future alarm signals comprises instructions that causes the security system control device to:

cause a siren to sound in response to receiving a first alarm signal from the first security sensor after the mode of operation has been changed.

14. The security system control device of claim 10, wherein the processor-executable instructions that causes the security system control device to begin processing future alarm signals comprises instructions that causes the security system control device to:

send a system alarm signal to a remote monitoring station in response to receiving a first alarm signal from the security sensor after the mode of operation has been changed.

15. The security system control device of claim 10, further comprising:

a transmitter coupled to the processor;

wherein the processor-executable instructions comprise further instructions that causes the security system control device to:

in response to receiving the first command, transmit, by the processor via the transmitter, a message to a remote location indicating that the first security sensor has been bypassed.

16. The security system control device of claim 10, wherein the processor-executable instructions comprise further instructions that cause the security system control device to:

in response to receiving the second command, provide, by the processor, an indication that the first security sensor has changed status from being bypassed to being monitored.

17. The security system control device of claim 10, wherein the second command is wirelessly received from a keypad coupled to the security system control device.

18. The security system control device of claim 10, wherein the second command is received from a wireless communication device.

* * * * *